Nov. 18, 1947.  W. L. COOP  2,430,915
UNIVERSAL DRILL JIG
Filed July 3, 1944

INVENTOR:
WILLIAM L. COOP
BY
ATTORNEY.

Patented Nov. 18, 1947

2,430,915

UNITED STATES PATENT OFFICE 2,430,915

UNIVERSAL DRILL JIG

William L. Coop, Hawthorne, Calif.

Application July 3, 1944, Serial No. 543,333

6 Claims. (Cl. 77—62)

The present invention has relation to drill jigs and particularly to jigs which are fitted to receive interchangeable adapters shaped to hold various production parts and wherein corresponding, interchangeable bushing plates are provided.

It is the general object of my invention to provide a simple and inexpensive drill jig which may be quickly adjusted to receive production parts and set to drill any particular part chosen. It is a further object to provide a jig in which the parts to be drilled may be more conveniently placed. Another object is to provide improved means for clamping such parts in position within the jig. A still further object is to provide a jig so compact that the overall height thereof permits use of the jig under the drills of a multispindle press, in which the space between the drills and the table of the press is insufficient for insertion of the ordinary type of universal drill jig.

Drawings are hereto annexed in which a preferred form of the invention is illustrated, and the various important features of the invention are set forth in detail in the following description.

The jig of my invention comprises a frame consisting of a base 1, in which are set posts 2, 3 to support a bushing plate 4. The latter is detachably mounted in order that it may be quickly withdrawn and another plate substituted, in which are provided bushings to suit a different part to be drilled.

Figure 1:
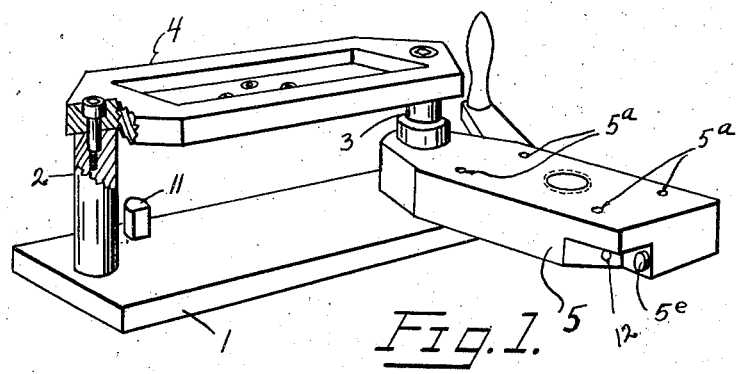
Fig. 1 is a perspective view showing the jig of the invention in open position, ready to receive an adapter and a part located therein.
Figure 2:
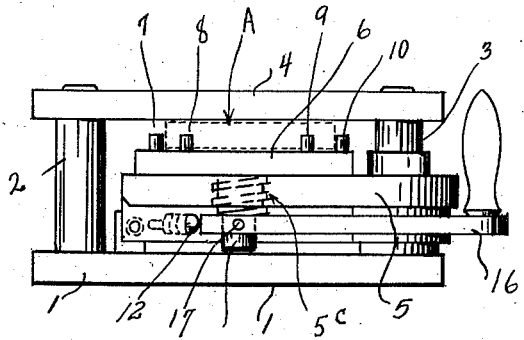
Fig. 2 is a front view of the complete jig combination in closed position, ready to clamp a production part in position therein.

A loading platform 5 is mounted for rotation on the post 3, and it is made with sockets $5^a$ for receiving an adapter 6, see Fig. 2, while the jig is still in the open position of Fig. 1. The adapter is shown fitted with locating pins 7, 8, 9, 10 for properly positioning thereon the part A to be drilled. Upon completion of the drilling operation, the adapter may be removed from the platform and an adapter for a different production part substituted, whereupon the platform is swung inward until a projection $5^e$ thereof is arrested by a stop 11, in which position it is correctly aligned with the drill bushings of the plate 4.

Figure 3:
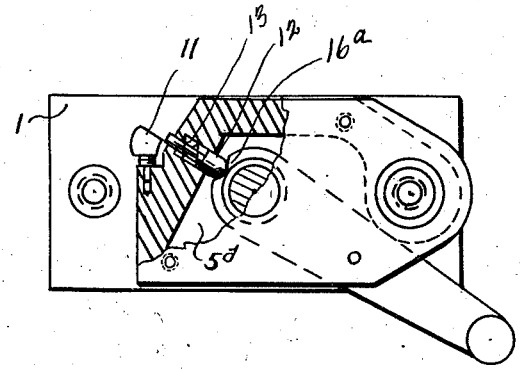
Fig. 3 is a plan view of the closed jig with the top plate thereof removed and the upper surface of the device seated below the top plate partly broken away in order to disclose interior parts thereof.
Figure 4:
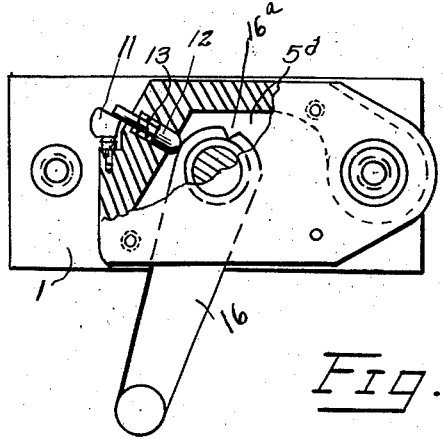
Fig. 4 is like Fig. 3, showing the jig as it appears when locked in closed position.

In the loading platform, and substantially centrally positioned relative to the adapter, is provided a threaded perforation $5^c$, in which a short stud 15 is seated. An operating lever 16 is rigidly secured to the lower end of this stud, as by means of a pin or set screw 17. When this lever is rotated clockwise, from the position of Fig. 3 to that of Fig. 4, it is found that the loading platform is elevated within the frame to bring the production part A into contact with the under surface of the bushing plate. The jig is now properly adjusted and ready for the drilling operation.

It is, however, advisable to lock the loading platform in closed position within the frame until the drilling operation is completed. This may be done in the following manner. The lower portion of the loading platform is recessed, substantially as indicated at $5^d$ in Fig. 3, to provide operating space for the lever 16. A perforation is made in the wall of this recessed portion, adjacent the stop 11, and a plunger 12 is seated in this perforation for registration with a notch $16^a$ of the lever. A spring 13 urges the plunger into this notch and it is important to note that, by merely swinging the lever into the position of Fig. 4, the plunger is caused to move out of this notch to take a position behind the stop 11, thereby to lock the loading platform in closed position. It is seen from this description that the movement of the lever to elevate the loading platform within the frame also is effective to lock the platform in elevated position therein.

In view of the foregoing it is seen that, when the loading platform is moved into closed position against the stop 11 and the lever is swung clockwise to bring the part to be drilled against the bottom surface of the bushing plate, the platform is securely locked in closed position and cannot be opened until the lever is returned to its initial position.

I claim:

1. In a universal drill jig comprising a frame having a base and posts on said base fitted at the top to receive interchangeable bushing plates, a loading platform rotatable on one of said posts to swing horizontally in and out of the frame, a production part locator seatable on said platform, the latter having a vertically directed threaded perforation centrally positioned relative to said locator, a threaded stud resting on said base and engaging the screw threads of said perforation, and a lever on said stud movable to rotate the stud thereby to elevate the platform so as to clamp the production part in position against the plate seated on said posts.

2. A universal drill jig comprising, a frame including posts seated at the top to receive interchangeable bushing plates, a loading platform seated on one of said posts to swing horizontally in and out of the frame, a production part locator seatable on said platform, the latter having a vertically directed threaded perforation centrally positioned relative to said locator, a threaded stud seated in the screw threads of said perforation, a lever on said stud movable to rotate the stud, thereby to elevate the platform after it has been swung into the frame so as to clamp the production part in position against the plate seated on said posts, and means actuated by movement of said lever to clamp the production part in position for locking the platform against swinging movement on said post.

3. A drill jig comprising, a frame having posts fitted at the top to receive a bushing plate, a platform for receiving the production part to be drilled, said platform being seated on one of said posts for horizontal swinging movement into and out of said frame, a stud for correctly locating the platform within the frame, means movable to elevate said platform, thereby to clamp the production part in position against said bushing plate, and a spring-held plunger in the platform actuated by movement of said means to engage said stud and thereby to lock the platform in elevated position against swinging movement on said post.

4. A drill jig comprising a frame having a top plate, a loading platform mounted in said frame for swinging movement into and out of the frame, an adapter mountable on said platform to receive the production part to be drilled, a lever supported by the platform and movable to elevate the platform against the under surface of said top plate as the platform reaches its position within the frame thereby to clamp said production part in drilling position, and means actuated by the movement of said lever to lock the platform against swinging movement out of the frame independently of the lever movement.

5. A drill jig comprising a frame, a lug on said frame, a bushing plate detachably secured to the top of said frame, a loading platform mounted in the frame for swinging movement into and out of the frame, an adapter mountable on said platform to receive the production part to be drilled, a lever supported by the platform and movable to elevate the platform as the latter reaches its position within the frame to clamp said production part in drilling position against said bushing plate, and a member on the platform actuated by movement of said lever to engage said lug thereby to lock the platform against swinging movement out of the frame independently of lever movement.

6. In a drill jig, a frame comprising a base and posts on said base fitted at the top to receive interchangeable bushing plates, a lug on said platform, a loading platform seated to swing horizontally on one of said posts into and out of said frame, a production part locator seatable on said platform, a lever supported by the platform and movable relative thereto to raise the platform as it reaches position within the frame thereby to clamp the production part in drilling position against said bushing plate, and means on the platform actuated by movement of said lever to engage said lug simultaneously to lock the platform against outward swinging movement on the post independently of lever movement.

WILLIAM L. COOP.

REFERENCES CITED

The following references are of record in the file of this patent:

UNITED STATES PATENTS

| Number | Name | Date |
|---|---|---|
| 819,372 | Noyes | May 1, 1906 |
| 1,322,978 | Verderber | Nov. 25, 1919 |
| 1,480,946 | Moulton | Jan. 15, 1924 |
| 1,628,729 | Ludwick | May 17, 1927 |
| 1,897,495 | Pecker | Feb. 14, 1933 |
| 1,911,304 | Brown, Jr. | May 30, 1933 |
| 2,140,762 | Pecker | Dec. 20, 1938 |